US011175826B2

(12) United States Patent
Kuhn

(10) Patent No.: US 11,175,826 B2
(45) Date of Patent: Nov. 16, 2021

(54) DIAGONAL NODE DATA BLOCK MATRIX FOR ADDING HASH-LINKED RECORDS AND DELETING ARBITRARY RECORDS WHILE PRESERVING HASH-BASED INTEGRITY ASSURANCE

(71) Applicant: Government of the United States of America, as represented by the Secretary of Commerce, Gaithersburg, MD (US)

(72) Inventor: David Richard Kuhn, Columbia, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 16/861,309

(22) Filed: Apr. 29, 2020

(65) Prior Publication Data
US 2020/0348841 A1 Nov. 5, 2020

Related U.S. Application Data

(60) Provisional application No. 62/842,616, filed on May 3, 2019.

(51) Int. Cl.
*G06F 3/06* (2006.01)
*G06F 21/62* (2013.01)

(52) U.S. Cl.
CPC ............ *G06F 3/0604* (2013.01); *G06F 3/067* (2013.01); *G06F 3/0652* (2013.01); *G06F 3/0659* (2013.01); *G06F 21/6218* (2013.01)

(58) Field of Classification Search
CPC .... G06F 3/0604; G06F 21/6218; G06F 3/067; G06F 3/0659; G06F 3/0652; G06F 3/0623; G06F 3/064; G06F 21/602
USPC ........ 713/176, 189, 193; 714/100, 699, 752; 711/154
See application file for complete search history.

(56) References Cited

U.S. PATENT DOCUMENTS

2014/0304569 A1* 10/2014 Blasco Claret ... H03M 13/6362
  714/776
2018/0254888 A1* 9/2018 Monahan ................ G06F 16/90
(Continued)

OTHER PUBLICATIONS

Accenture, et al., "Accenture debuts prototype of "editable" blockchain for enterprise and permissioned systems", Accenture Newsroom, Sep. 30, 2016, doi:https://newsroom.accenture.com/news/accenture-debuts-prototype-of-editable-blockchain-for-enterprise-and-permissioned-systems.htm.

*Primary Examiner* — Hong C Kim
(74) *Attorney, Agent, or Firm* — Office of Chief Counsel for National Institute of Standards and Technology

(57) ABSTRACT

Provided is a process including: initializing a data block matrix; making supra-diagonal nodes that include at most one more node than sub-diagonal nodes; making a hash nodes with a hash sequence length that is proportional to a number of nodes in the row or column of nodes in which the hash node is arranged; and writing data blocks in nodes of the data block matrix such that a number of data blocks in nodes in the data block matrix is less than ($N^2-N$) for N number of nodes in the data block matrix, wherein the data block matrix has dispersed data blocks.

8 Claims, 16 Drawing Sheets

(56) References Cited

U.S. PATENT DOCUMENTS

2019/0377498 A1\* 12/2019 Das .................. G06F 3/064
2020/0259634 A1\* 8/2020 Wilke ............... H03M 13/091

\* cited by examiner

|   |   | 0 | 1 | 2 | 3 | 4 |   |
|---|---|---|---|---|---|---|---|
|   | 0 | ● | ① | 3 | 7 | 13 | $H_{0,-}$ |
|   | 1 | ② | ● | 5 | 9 | 15 | $H_{1,-}$ |
|   | 2 | 4 | 6 | ● | 11 | 17 | $H_{2,-}$ |
|   | 3 | 8 | 10 | 12 | ● | 19 | $H_{3,-}$ |
|   | 4 | 14 | 16 | 18 | 20 | ● | $H_{4,-}$ |
|   |   | $H_{-,0}$ | $H_{-,1}$ | $H_{-,2}$ | $H_{-,3}$ | $H_{-,4}$ | etc. |

Column location indexes

Order that data blocks are written to nodes

Row location indexes balance property: supra-diagonal nodes contains at most one more data block than sub-diagonal nodes

FIG. 3

Exemplary hash computation

| 0 | 1 | 2 | 3 | 4 | |
|---|---|---|---|---|---|
| | | | | | $H_{0,-}$ |
| | 0101 | 1100 | 0100 0001 | 1110 | $H_{1,-}$ |
| | | | | | $H_{2,-}$ |
| | | | | | $H_{3,-}$ |
| | | | | | $H_{4,-}$ |
| $H_{-,0}$ | $H_{-,1}$ | $H_{-,2}$ | $H_{-,3}$ | $H_{-,4}$ | |

$H_{1,-}$ has hash value that is a concatenation of individual block hashes
= hash( hash(0101) ||
hash(1100) ||
hash(0100) ||
hash(0001) ||
hash(1110) )

where || is concatenation

FIG. 6

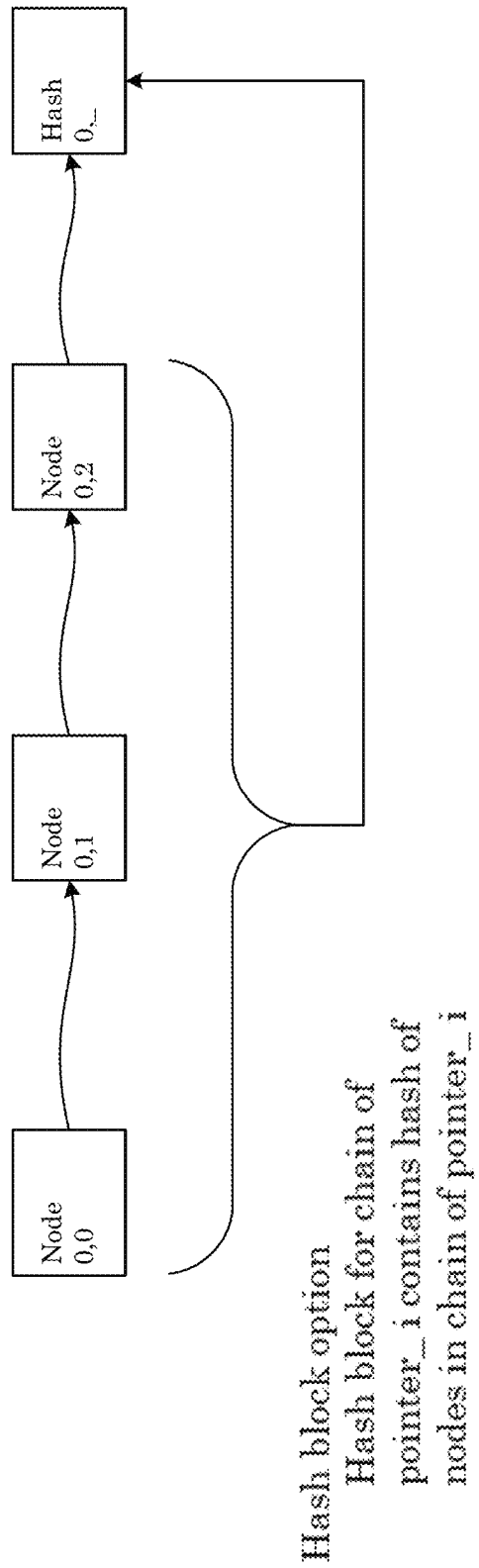

Hash block option
Hash block for chain of pointer_i contains hash of nodes in chain of pointer_i Arrows indicate pointers or links from the node to other nodes that will be added. That is, a pointer from x to y is a reference from x to memory storage at y. As noted in Wikipedia, "the actual format and content of a pointer variable is dependent on the underlying computer architecture."

In this implementation, cryptographic hash value is computed from the concatenation of the contents of nodes with the same value for pointer_i (in this example given as 0_ for nodes with pointer_i = 0)

FIG. 7

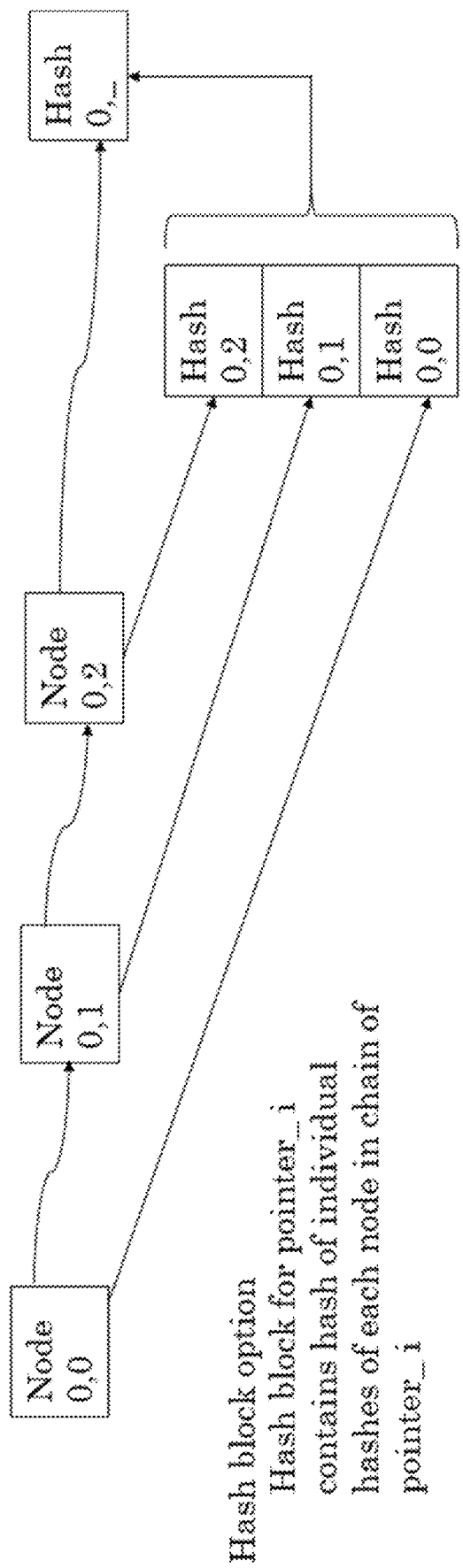

Hash block option
Hash block for pointer_i contains hash of individual hashes of each node in chain of pointer_i Arrows indicate pointers or links from the node to other nodes that will be added. That is, a pointer from x to y is a reference from x to memory storage at y. As noted in Wikipedia, "the actual format and content of a pointer variable is dependent on the underlying computer architecture."

In this implementation, cryptographic hash value is computed individually for each node with the indicated value for pointer_i (in this example given as 0_ for nodes with pointer_i = 0). A subsequent hash of the individual hashes is computed and stored for the nodes linked by pointer_i.

FIG. 8

Upper half computation
for data block in supra-diagonal node:

$$s = \lfloor \sqrt{B+1} \rfloor$$
$$j = B < s^2 + s \,?\, s : s+1$$
$$i = (B - (j^2 - j + 1))/2$$

Exemplary code:

```
s = floor(sqrt(B+1));
if (B < s*s+s) j = s; else j = s+1;
i = (B - (j*j - j + 1))/2;
```

Lower half computation
for data block in sub-diagonal node:

$$s = \lfloor \sqrt{B} \rfloor$$
$$i = B \leq s^2 + s \,?\, s : s+1$$
$$j = (B - (i^2 - i + 2))/2$$

Exemplary code:

```
s = floor(sqrt(B));
if (B <= s*s+s) i = s; else i = s+1;
j = (B - (i*i - i + 2))/2;
```

FIG. 11

|   | 0 | 1 | 2 | 3 | 4 |        |
|---|---|---|---|---|---|--------|
| 0 |   |   |   |   |   | $H_{0,-}$ |
| 1 |   |   |   |   |   | $H_{1,-}$ |
| 2 |   |   |   |   |   | $H_{2,-}$ |
| 3 |   |   | X |   |   | $H_{3,-}$ |
| 4 |   |   |   |   |   | $H_{4,-}$ |
|   | $H_{-,0}$ | $H_{-,1}$ | $H_{-,2}$ | $H_{-,3}$ | $H_{-,4}$ |  |

Block matrix

FIG. 14

| | 0 | 1 | 2 | 3 |
|---|---|---|---|---|
| 0 | 1 | 2 | 5 | 10 |
| 1 | 3 | 4 | 7 | 12 |
| 2 | 6 | 8 | 9 | 14 |
| 3 | 11 | 13 | 15 | 16 |

Block matrix with diagonal used

FIG. 15

DIAGONAL NODE DATA BLOCK MATRIX FOR ADDING HASH-LINKED RECORDS AND DELETING ARBITRARY RECORDS WHILE PRESERVING HASH-BASED INTEGRITY ASSURANCE

CROSS REFERENCE TO RELATED APPLICATIONS

The application claims priority to U.S. Provisional Patent Application Ser. No. 62/842,616 filed May 3, 2019, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries can be directed to the Technology Partnerships Office, NIST, Gaithersburg, Md., 20899; voice (301)-975-2573; email tpo@nist.gov.

BRIEF DESCRIPTION

Disclosed is a tangible, non-transitory, machine-readable medium storing instructions that when executed by one or more processors effectuate operations comprising: performing, with one or more processors, initialization for making a data block matrix and writing data blocks in nodes of the data block matrix, wherein: the data block matrix holds nodes that are arranged in rows and columns of the data block matrix; a size of the data block matrix is n×m with the number of rows is n, and the number of columns is m each node has location indexes location row.r and location column.c and pointer indexes pointer row.i and pointer column.j, wherein r, c, i, and j independently are integers; the location indexes provide a row indicated by integer r and column indicated by integer c at which the node is located in the data block matrix, and the pointer indexes provide references, from a selected node to a first node and a second node, with pointer row.i being a pointer from the selected node to the first node that is in the same location row.r=i as the selected node and with pointer column.j being a pointer from the selected node to the second node that is in the same location column.c=j as the node; (location row.0, location column.0) of the data block matrix holds a primary node; each (location row.0, location column.1 ... m−1) of the data block matrix holds a column edge node; each (location row.1 ... n−1, location column.0) of the data block matrix holds a row edge node; the data block matrix holds diagonal nodes at each (location row.r=c, location column.c) except for (location row.r=n, location column.m, for n=m) and; each row r of the data block matrix terminates at (location row.r, location column.m) that holds a hash row node $r,\_$; and each column c of the data block matrix terminates at (location row.n, location column.c) that holds a hash row node$\_,c$, the initialization comprising: receiving, with one or more processors, an initialization command to prepare the one or more processors for writing the primary node at (location row.0, location column.0) as a first diagonal node; producing, with one or more processors in response to receiving the initialization command, the primary node at (location row.0, location column.0) and having pointers comprising (pointer row.0, pointer column.0), wherein the primary node does not include a null data block; and storing the primary node in memory; writing, with one or more processors, a first null data block comprising: receiving a write command to write a first null data block; writing the first null data block to the primary node; making edges nodes by: making a first column edge node proximate to the row edge node and writing a first data block to the first column edge node; and making a first row edge node proximate to the row edge node and writing a second data block to the first row edge node; making additional diagonal nodes with null data blocks and additional edge nodes and interior nodes with data blocks by iteratively: firstly making another edge column node and writing another data block to said edge column node; secondly making another edge row node and writing another data block to said edge row node; thirdly and successively making interior nodes along a counter-diagonal direction of the data block matrix and writing another data block to each of the interior nodes upon creation of each of said interior node; and fourthly making another diagonal node and writing another null data block to said diagonal node; making a hash row node $r,\_$ at location column.m at a terminus of each row and writing another data block to each said hash row node $r,\_$ and making a hash column node$\_,c$ at location row.n at a terminus of each column and writing another data block to said hash column node$\_$c, wherein: each hash row node comprises a hash of nodes in the row containing said hash row node; each hash column node comprises a hash of nodes in the column containing said hash column node; the data block matrix provides deletion of an arbitrary data block while preserving hash-based integrity assurance that other data blocks are unchanged; and the data block matrix provides modification, with hash values, of an arbitrary data block.

Disclosed is a method comprising: performing, with one or more processors, initialization for making a data block matrix and writing data blocks in nodes of the data block matrix, wherein: the data block matrix holds nodes that are arranged in rows and columns of the data block matrix; a size of the data block matrix is n×m with the number of rows is n, and the number of columns is m each node has location indexes location row.r and location column.c and pointer indexes pointer row.i and pointer column.j, wherein r, c, i, and j independently are integers; the location indexes provide a row indicated by integer r and column indicated by integer c at which the node is located in the data block matrix, and the pointer indexes provide references, from a selected node to a first node and a second node, with pointer row.i being a pointer from the selected node to the first node that is in the same location row.r=i as the selected node and with pointer column.j being a pointer from the selected node to the second node that is in the same location column.c=j as the node; (location row.0, location column.0) of the data block matrix holds a primary node; each (location row.0, location column.1 ... m−1) of the data block matrix holds a column edge node; each (location row.1 ... n−1, location column.0) of the data block matrix holds a row edge node; the data block matrix holds diagonal nodes at each (location row.r=c, location column.c) except for (location row.r=n, location column.m, for n=m) and; each row r of the data block matrix terminates at (location row.r, location column.m) that holds a hash row node $r,\_$; and each column c of the data block matrix terminates at (location row.n, location column.c) that holds a hash row node$\_,c$, the initialization comprising: receiving, with one or more processors, an initialization command to prepare the one or more processors for writing the primary node at (location row.0, location column.0) as a first diagonal node; producing, with one or more processors in response to receiving the initialization command, the primary node at (location row.0, location column.0) and having pointers comprising (pointer row.0, pointer column.0), wherein the primary node does not include a null data block; and storing the primary node in memory; writing, with one or more processors, a first null data block comprising: receiving a write command to write a first null data block; writing the first null data block to the primary node; making edges nodes by: making a first column edge node proximate to the row edge node and writing a first data block to the first column edge node; and making a first row edge node proximate to the row edge node and writing a second data block to the first row edge node; making additional diagonal nodes with null data blocks and additional edge nodes and interior nodes with data blocks by iteratively: firstly making another edge column node and writing another data block to said edge column node; secondly making another edge row node and writing another data block to said edge row node; thirdly and successively making interior nodes along a counter-diagonal direction of the data block matrix and writing another data block to each of the interior nodes upon creation of each of said interior nodes; and fourthly making another diagonal node and writing another null data block to said diagonal node; making a hash row node r,_ at location column.m at a terminus of each row and writing another data block to each said hash row node r,_; and making a hash column node_,c at location row.n at a terminus of each column and writing another data block to said hash column node_,c, wherein: each hash row node comprises a hash of nodes in the row containing said hash row node; each hash column node comprises a hash of nodes in the column containing said hash column node; the data block matrix provides deletion of an arbitrary data block while preserving hash-based integrity assurance that other data blocks are unchanged; and the data block matrix provides modification, with hash values, of an arbitrary data block.

BRIEF DESCRIPTION OF THE DRAWINGS

The following description cannot be considered limiting in any way. With reference to the accompanying drawings, like elements are numbered alike.

FIG. 3 shows an order of writing data blocks in data block matrix 200;

FIG. 6 shows details for computation of a hash;
FIG. 7 shows details for computation of a hash;
FIG. 8 shows details for computation of a hash;
FIG. 11 shows details for reading a data block in a node;
FIG. 14 shows a data block matrix;
FIG. 15 shows details for modifying or deleting a data block in a node.

DETAILED DESCRIPTION

Figure 1:
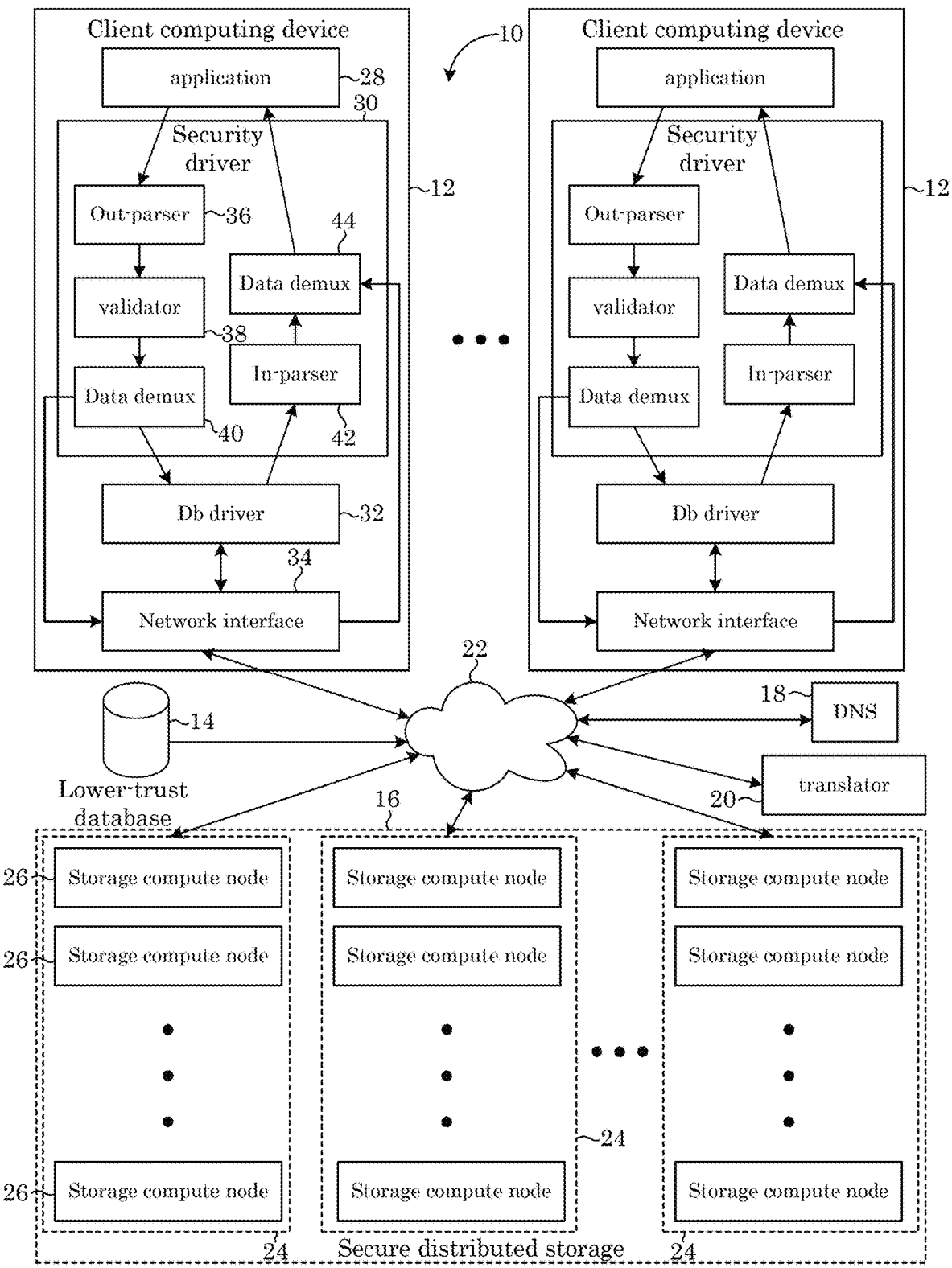
FIG. 1 shows a logical and physical architecture block diagram for a computing environment in which operations herein can be implemented.

A detailed description of one or more embodiments is presented herein by way of exemplification and not limitation.

It has been discovered that a data block matrix herein provides a data structure that supports addition of hash-linked data blocks and deletion of arbitrary data blocks from the data block matrix, preserving hash-based integrity assurance that other data blocks are unchanged. The data block matrix includes an array of nodes that include the data blocks, and the rows and columns of the data block matrix each terminate in a hash node. The hash nodes have hash values for the data in the data blocks for the particular row or column that the hash node terminates so that a selected data block can be deleted or modified, assuring that other blocks have not been affected. Advantageously, the data block matrix can be implemented in a decentralized system to provide data replication among peers and can be incorporated in an application for integrity protection that conventionally uses a permissioned blockchain.

The data block matrix provides deletion or modification of a selected data block with hash values, assuring that other data blocks are unaffected. Accordingly, integrity of data blocks that have not been deleted or modified is assured. A data block can be deleted by overwriting data in a node with zeroes or other values. Moreover, the data block matrix has data balance, wherein supra-diagonal nodes include at most one more node than sub-diagonal nodes. It is contemplated that a hash sequence length can be a number of blocks in a row or column hash that is proportional to N for a matrix with N data blocks by a balance property of writing data blocks to the nodes. Moreover, a total number of data blocks in the data block matrix can be $N^2-N$ because data in diagonal nodes are null. Further, the data block matrix provides data block dispersal in the nodes, wherein no consecutively written data blocks are written in nodes that are in the same row or column of the data block matrix.

It should be appreciated that conventional blockchain or other distributed ledger technology provide data management with cryptographically-based integrity guarantees. However, conventional blockchains and DLT do not allow for changes or deletions of information in data blocks such that conventional technologies can prevent implementation in privacy-sensitive applications or systems that adhere to privacy regulations that involve provision of data modification. Data block matrix 200 provides for modification or deletion of data blocks via hash nodes. In an embodiment, with reference to FIG. 1 and FIG. 2, data block matrix 200 can be implemented by computing environment 10. Here, computing environment 10 is an exemplary computing architecture in which the present operations can be implemented. In some embodiments, the present operations are implemented as a multi-tenant distributed application in which some computing hardware is shared by multiple tenants that access resources on the computing hardware in computing devices controlled by those tenants, e.g., on various local area networks operated by the tenants. In some embodiments, a single tenant executes the computational entities on privately-controlled hardware with multiple instances of computing environment 10 existing for different organizations. Some embodiments implement a hybrid approach in which multi-tenant computing resources (e.g., computers, virtual machines, containers, microkernels, or the like) are combined with on-premises computing resources or private cloud resources. In some embodiments, computing environment 10 include or extend upon security features of a computing environment.

In an embodiment, computing environment 10 includes a plurality of client computing devices 12, lower-trust database 14, secure distributed storage 16, domain name service 18, and translator server 20 (or elastically scalable collection of instances of translator servers disposed behind a load balancer). In some embodiments, these components can communicate with one another via Internet 22 and various local area networks in some cases. In some embodiments, communication can be via virtual private networks overlaid on top of the public Internet. In some embodiments, the illustrated components can be geographically distributed, e.g., more than 1 kilometer apart, more than 100 kilometers apart, more than 1000 kilometers apart, or further, e.g., distributed over the content event of North America or the world. In some embodiments, the components are co-located and hosted within an air-gapped or non-air-gapped private network. In some embodiments, the illustrated blocks that connects to Internet 22 can be implemented with computing devices described below with reference to FIG. 13.

In some embodiments, client computing devices 12 independently can be one of a plurality of computing devices operated by users or applications of an entity that wishes to securely store data. For example, a given business or governmental organization can have more than 10, more than 100, more than 1,000, or more than 10,000 users and applications, each having associated computing devices that access data stored in lower-trust database 14 (or a collection of such databases or other types of datastores) and secure distributed storage 16. In some embodiments, multiple entities access the system in environment 10, e.g. more than five, more than 50, more than 500, or more than 5000 different entities access shared resources with respective client computing devices or can have their own instance of computing environment 10. In some embodiments, some client computing devices 12 are end-user devices, e.g., executing a client-side component of a distributed application that stores data in lower-trust database 14 and secure distributed storage 16, or reads such data. Client computing devices can be laptops, desktops, tablets, smartphones, or rack-mounted computing devices such as servers. In some embodiments, the client-computing devices are Internet-of-things appliances, like smart televisions, set-top media payers, security cameras, smart locks, self-driving cars, autonomous drones, industrial sensors, industrial actuators such as electric motors, in-store kiosks, or the like. In some embodiments, some client computing devices 12 are headless computing entities, such as containers, microkernels, virtual machines, or rack-mounted servers that execute a monolithic application or one or more services in a service-oriented application, such as a micro services architecture, that stores or otherwise accesses data in lower-trust database 14 or secure distributed storage 16.

In some embodiments, lower-trust database 14 and secure distributed storage 16 each store a portion of data accessed with client computing devices 12, in some cases with pointers therebetween stored in one or both of these datastores. In some embodiments, as described below, this data is stored in a manner that abstracts away secure distributed storage 16 from a workload application through which data is accessed (e.g., read or written). In some embodiments, data access operations store or access data in lower-trust database 14 and secure distributed storage 16 with a workload application that is not specifically configured to access data in secure distributed storage 16, e.g., one that is configured to operate without regard to whether secure distributed storage 16 is present, and for which the storage of data in secure distributed storage 16 is transparent to the workload application storing content in lower-trust database 14 and secure distributed storage 16. In some embodiments, such a workload application can be configured to, and otherwise designed to, interface only with lower-trust database 14 when storing this data and, in some embodiments, wrap interfaces for lower-trust database 14 with additional logic that routes some of data to secure distributed storage 16 and retrieves that data from secure distributed storage 16 in a manner that is transparent to the workload application accessing content, i.e., data written or read by the workload application.

Content stored in lower-trust database 14 and secure distributed storage 16 can be created or accessed with a variety of different types of applications, such as monolithic applications or multi-service distributed applications (e.g., implementing a microservices architecture in which each service is hosted by one of client computing devices 12). Examples include email, word processing systems, spreadsheet applications, version control systems, customer relationship management systems, human resources computer systems, accounting systems, enterprise resource management systems, inventory management systems, logistics systems, secure chat computer systems, industrial process controls and monitoring, trading platforms, banking systems, and the like. Such applications that generate or access content in database 14 for purposes of serving the application's functionality are referred to herein as "workload applications," to distinguish those applications from infrastructure code by which present operations are implemented, which is not to suggest that these bodies of code cannot be integrated in some embodiments into a single workload application having infrastructure functionality. In an embodiment, several workload applications (e.g., more than 2, more than 10, or more than 50), such as selected among those in the preceding list, share resources provided by the infrastructure code and functionality described herein.

In some embodiments, lower-trust database 14 is one of various types of datastores described above. In an embodiment, lower-trust database 14 is a relational database, having a plurality of tables, each with a set of columns corresponding to different fields, or types of values, stored in rows, or records (e.g., a row in some implementations) in the table, in some embodiments, each record, corresponding to a row can be a tuple with a primary key that is unique within that respective table, one or more foreign keys that are primary keys in other tables, and one or more other values corresponding to different columns that specify different fields in the tuple. According to an embodiment, the database is a column-oriented database in which records are stored in columns with different rows corresponding to different fields. In some embodiments, lower-trust database 14 is a relational database configured to be accessed with structured query language (SQL) commands such as commands to select records satisfying criteria specified in the command, commands to join records from multiple tables, or commands to write values to records in these tables.

In an embodiment, lower-trust database 14 is another type of database, such as a noSQL database, like various types of non-relational databases. In some embodiments, lower-trust database 14 is a document-oriented database such as a database storing a plurality of serialized hierarchical data format documents, like JAVASCRIPT object notation (JSON) documents, or extensible markup language (XML)

documents. Access requests can be an xpath or JSON-path command. In some embodiments, lower-trust database 14 is a key-value data store having a collection of key-value pairs in which data is stored. According to an embodiment, lower-trust database 14 is any of a variety of other types of datastores, e.g., instances of documents in a version control system, memory images, a distributed or non-distributed file-system, or the like. A single lower-trust database 14 is shown but other some embodiments include more instances, such as more than two, more than five, or more than 10 different databases. In some embodiments, some of lower-trust databases 14 are a database of a software-as-a-service application hosted by a third party and accessed via a third-party application program interface via exchanges with a user's web browser or another application. In some embodiments, lower-trust database 14 is a mutable data store or an immutable data store.

In an embodiment, access to data in lower-trust database 14 and corresponding access to corresponding records in the secure distributed storage 16 is designated in part with roles and permissions stored in association with various user accounts of an application used to access that data. In some embodiments, these permissions are modified, e.g., revoked, or otherwise adjusted.

Database 14 is labeled as "lower-trust." The term "lower-trust" does not require an absolute measure of trust or a particular state of mind with respect to a party but distinguishes database 14 from secure distributed storage 16 that has certain security features in some embodiments that can be referred to as a "higher-trust" database.

In an embodiment, some of the data that an application writes to or has written to in lower-trust database 14 is intercepted or moved to secure distributed storage 16. Further, access requests from a workload application to lower-trust database 14 can be intercepted, or responses from such access request can be intercepted so that data from lower-trust database 14 can be merged with data from secure distributed storage 16 that is responsive to the request before being presented to the application. Further, read requests can be intercepted, modified, and iteratively executed in a manner that limits how much information in the secure distributed storage is revealed to a client computing device at any one time, as described below.

In an embodiment, secure distributed storage 16 includes data centers 24 that are distributed geographically and are heterogeneous architectures. In an embodiment, data centers 24 are various public or private clouds or on-premises data centers for organization-users, such as tenants of computing environment 10. In an embodiment, data centers 24 are geographically distributed over the United States, North America, or the world, in some embodiments with different data centers more than 100 or 1,000 kilometers apart, and in some embodiments with different data centers 24 in different jurisdictions. In an embodiment, each of data centers 24 include a distinct private subnet through which computing devices, such as rack-mounted computing devices in the subnet communicate, e.g., via wrap top-of-rack switches within a data center, behind a firewall relative to Internet 22. In some embodiments, each of data centers 24, or different subsets of data centers 24, are operated by a different entity, implementing a different security architecture and having a different application program interface to access computing resources, examples including AMAZON WEB SERVICES, AZURE from Microsoft, and RACK SPACE. Three different data centers 24 are shown, but embodiments can include more data centers, such as more than five, more than 15, or more than 50. In an embodiment, the datacenters are from the same provider but in different regions.

In an embodiment, each of data centers 24 includes a plurality of different hosts exposed by different computational entities, like microkernels, containers, virtual machines, or computing devices executing a non-virtualized operating system. Each host can have an Internet Protocol address on the subnet of respective data center 24 and can listen to and transmit via a port assigned to an instance of an application by which data is stored in a distributed ledger. In an embodiment, each storage compute node 26 can correspond to a different network hosts, each network coast having a server that monitors a port, and configured to implement an instance of with hash pointers, examples of which include block chains and related data structures. In some cases, these storage compute nodes 26 can be replicated, in some cases across data centers 24, e.g., with three or more instances serving as replicated instances, and some embodiments can implement operations to determine consensus among these replicated instances as to state of stored data. Further, an embodiment can elastically scale the number of such instances based on amount of data stored, amounts of access requests, or the like.

In an embodiment, a domain name service (DNS) 18, such as a private DNS, maps uniform resource identifiers (such as uniform resource locators) to Internet Protocol address/port number pairs, e.g., of storage compute nodes 26, translator 20, and in some cases other client computing devices 12 or other resources in computing environment 10. In an embodiment, client computing device 12, storage compute node 16, database 14, or translator 20 encounters a uniform resource identifier, such as a uniform resource locator, and that computing entity can be configured to access DNS 18 at an IP address and port number pair of DNSs 18. The entity can send a request to DNS 18 with the uniform resource identifier, and DNS 18 can respond with a network and process address, such as Internet Protocol address and port number pair corresponding to the uniform resource identifier. As a result, underlying computing devices can be replaced, replicated, moved, or otherwise adjusted, without impairing cross-references between information stored on different computing devices. In an embodiment, computing environments achieve such flexibility without using domain name service 18, e.g., by implementing a distributed hash table or load-balancing that consistently maps data based on data content, e.g., based on a prefix or suffix of a hash based on data or identifiers of data to the appropriate computing device or host. In an embodiment, a load balancer routes requests to storage compute nodes 26 based on a prefix of a node identifier, such as a preceding or trailing threshold number of characters.

In an embodiment, a virtual machine or container manager is configured to orchestrate or otherwise elastically scale instances of compute nodes and instances of translator 20, e.g., automatically applying corresponding images to provisioned resources within data center 24 responsive to need and spinning down instances as need diminishes.

In an embodiment, translator 20 is configured to execute a routine that translates between an address space of lower-trust database 14 and an address space of secure distributed storage 16. In an embodiment, translator 20 can receive one or more records from client computing device 12 that is going to be written to lower-trust database 14, or can receive such records from lower-trust database 14, and those records can be mapped to segment identifiers or other pointers, such as other node identifiers in secure distributed storage 16. Translator 20 can then cause those records to be stored in secure distributed storage 16 and segment identifiers to be stored in place of those records in lower-trust database 14, such as in place of individual values in records. In an embodiment, translation occurs at the level of individual values corresponding to individual fields in individual records, like rows of a table in database 14. In an embodiment, larger collections of data, e.g., accepting entire records, like entire rows, or plurality of columns, like a primary key and an individual value other than the primary key in a given row are translated. In an embodiment, files or other binary larger objects (BLOBS) are accepted. Translator 20 can replace those values in lower-trust database 14 with a pointer, like a segment identifier in the secure distributed storage and then cause data to be stored in secure distributed storage 16. In an embodiment, documents are stored, which can be relatively small stand-alone values to binary large objects encoding file-system objects like word-processing files, audio files, video files, chat logs, compressed directories, and the like. According to an embodiment, a document corresponds to an individual value within a database, or a document corresponds to a file or other binary large object. In an embodiment, documents are larger than one byte, 100 bytes, 1 kB, 100 kB, 1 MB, or 1 GB. In an embodiment, documents correspond to messages in a messaging system, or printable document format documents, text-editable documents, audio files, video files or the like.

In an embodiment, translator 20 includes code that receives requests from drivers and facilitates translation of data. In an embodiment, translator 20 is an elastically scaled set of translators 20 remotely hosted in a public or private cloud.

Figure 2:
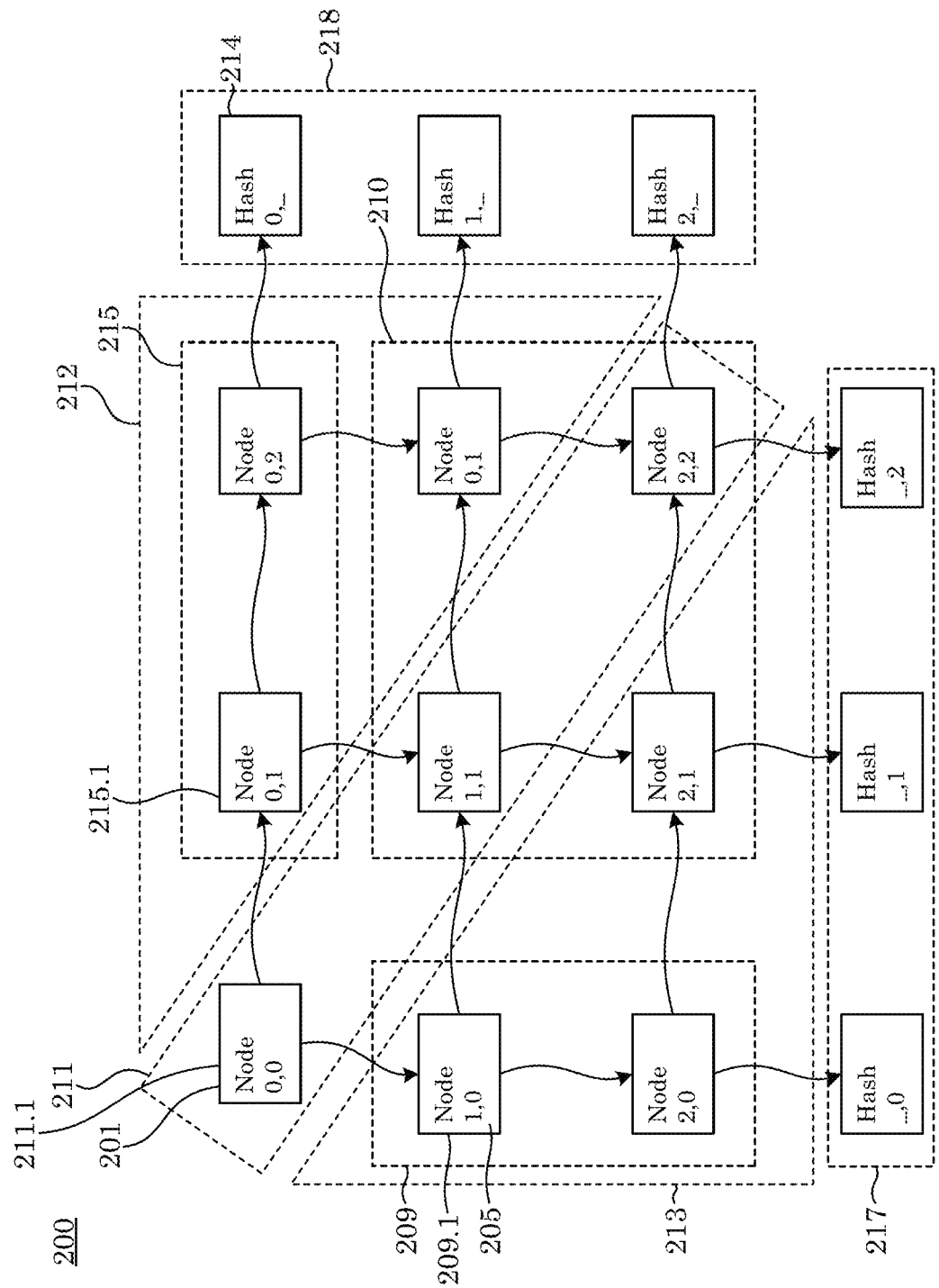
FIG. 2 shows data block matrix 200.
Figure 4:
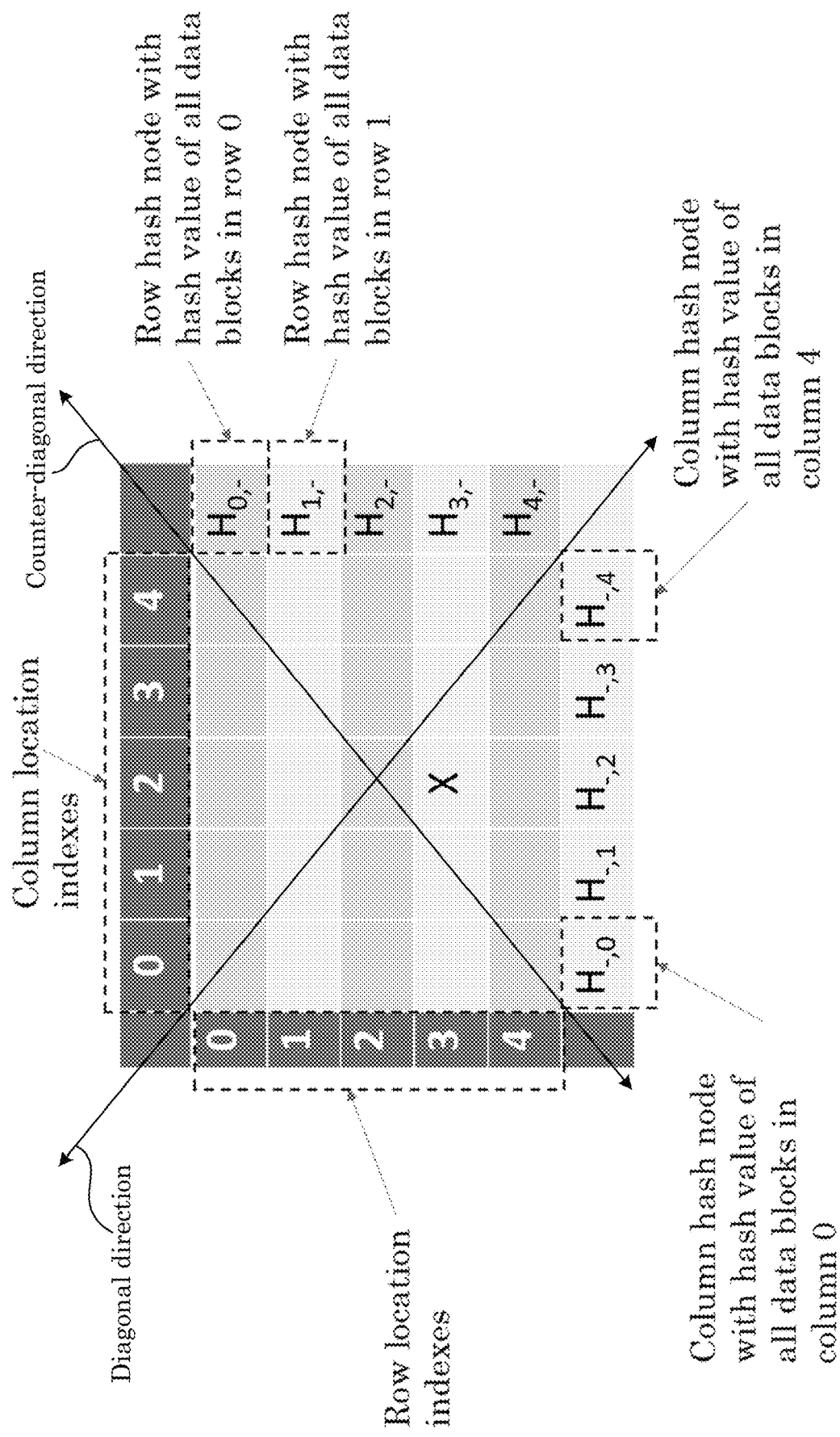
FIG. 4 shows a plurality of hash node 214 that includes hash row node 218 and hash column node 217.
Figure 5:
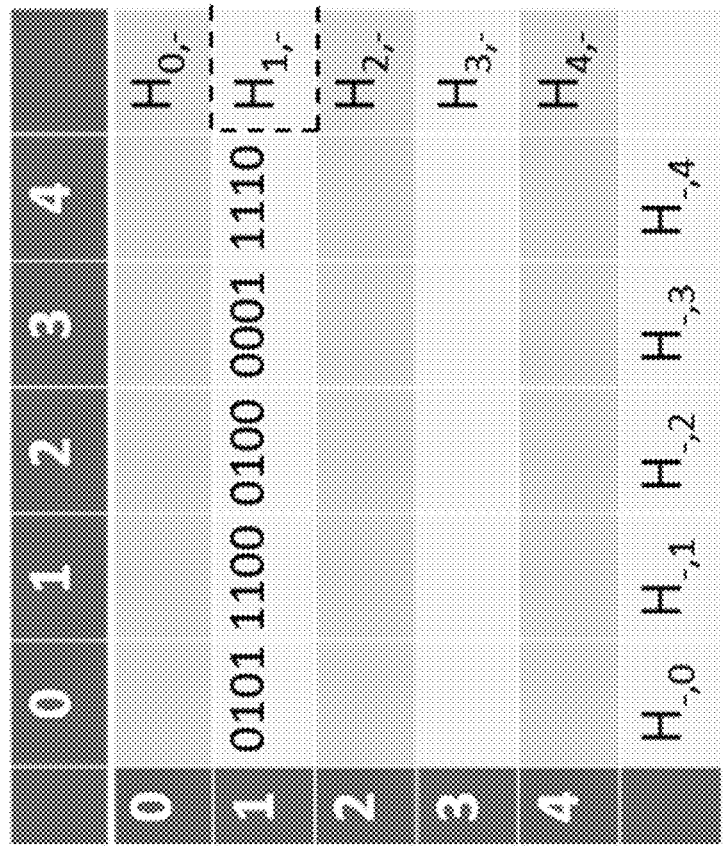
FIG. 5 shows details for computation of a hash.
Figure 9:
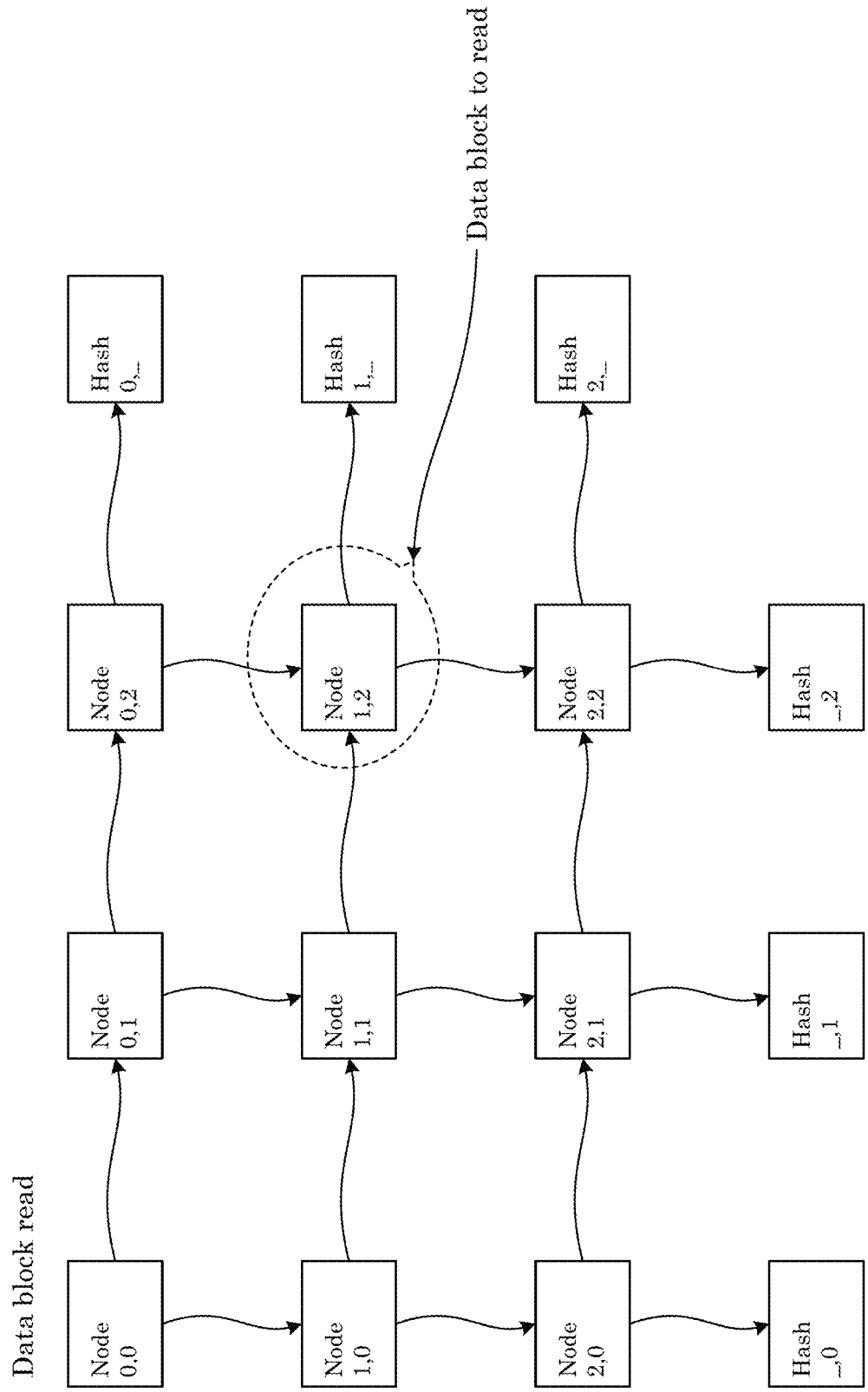
FIG. 9 shows details for reading a data block in a node.
Figure 10:
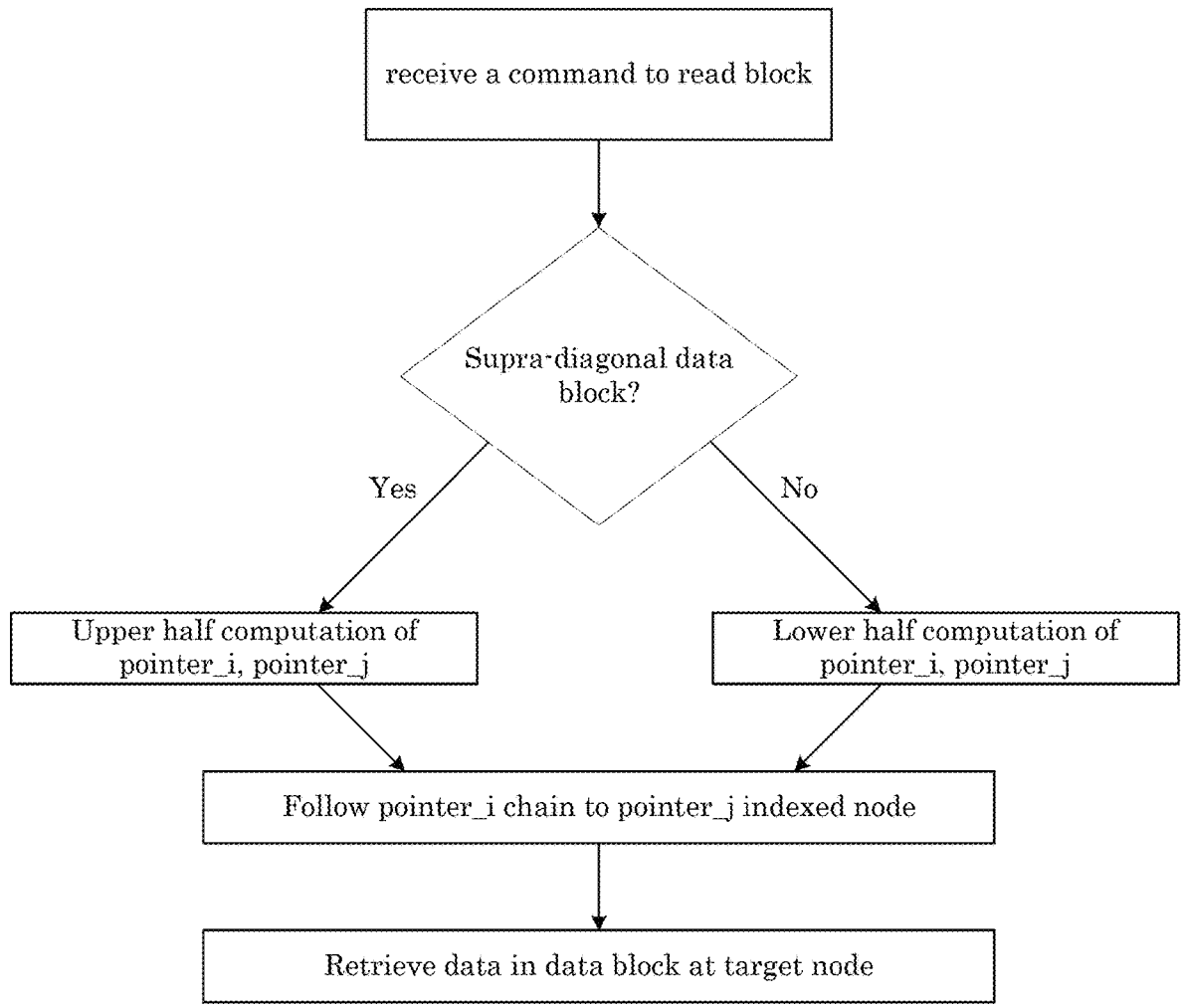
FIG. 10 shows reading a data block in a node.
Figure 12:
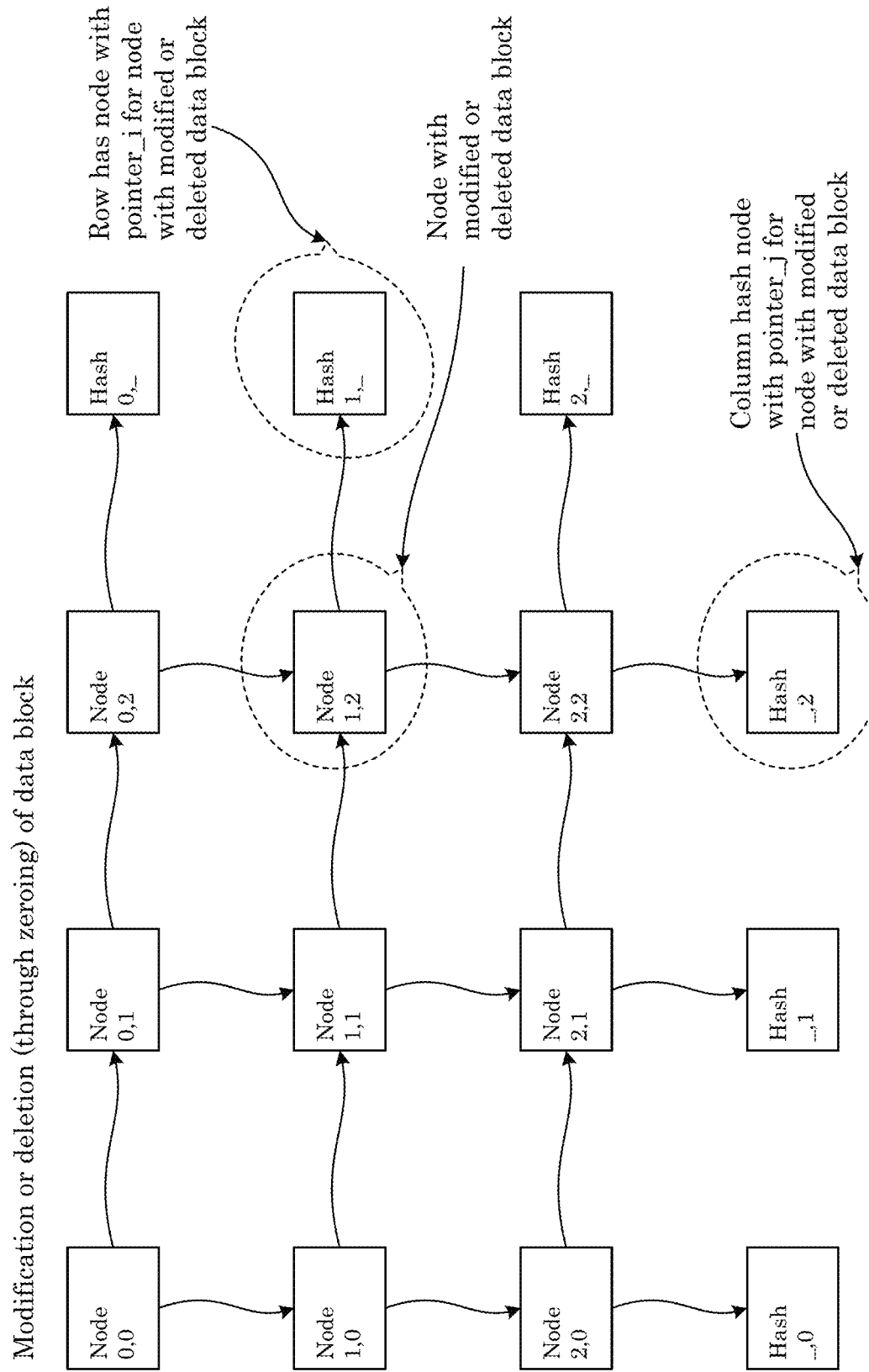
FIG. 12 shows details for modifying or deleting a data block in a node.

According to an embodiment, with reference to FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13, translator 20 or other component of the environment shown in FIG. 1 includes a tangible, non-transitory, machine-readable medium that stores instructions that, when executed by one or more processors, effectuate operations including: performing, with one or more processors, initialization for making data block matrix 200 and writing data blocks 216 in nodes of data block matrix 200, wherein: data block matrix 200 holds nodes that are arranged in rows and columns of data block matrix 200; a size of data block matrix 200 is n×m with the number of rows is n, and the number of columns is m; each node has location indexes location row.r and location column.c and pointer indexes pointer row.i and pointer column.j, wherein r, c, i, and j independently are integers; the location indexes provide a row indicated by integer r and column indicated by integer c at which the node is located in data block matrix 200, and the pointer indexes provide references, from a selected node to a first node and a second node, with pointer row.i being a pointer from the selected node to the first node that is in the same location row.r=i as the selected node and with pointer column.j being a pointer from the selected node to the second node that is in the same location column.c=j as the node; (location row.0, location column.0) of data block matrix 200 holds primary node 201; each (location row.0, location column . . . m−1) of data block matrix 200 holds column edge node 215; each (location row.1 . . . n−1, location column.0) of data block matrix 200 holds row edge node 209; data block matrix 200 holds diagonal nodes 211 at each (location row.r=c, location column.c) except for (location row.r=n, location column.m, for n=m) and; each row r of data block matrix 200 terminates at (location row.r, location column.m) that holds hash row node r,_ 218; and each column c of data block matrix 200 terminates at (location row.n, location column.c) that holds hash column node_,c 217, the initialization including: receiving, with one or more processors, an initialization command to prepare the one or more processors for writing primary node 201 at (location row.0, location column.0) as first diagonal node 211.1; producing, with one or more processors in response to receiving the initialization command, primary node 201 at (location row.0, location column.0) and having pointers 206 comprising (pointer row.0, pointer column.0), wherein primary node 201 does not include null data block 204; and storing primary node 201 in memory; writing, with one or more processors, first null data block 204.1 including: receiving a write command to write first null data block 204.1; writing first null data block 204.1 to primary node 201; making edges nodes (209, 215) by: making first column edge node 215.1 proximate to primary node 201 and writing first data block 216.1 to first column edge node 215.1; and making a first row edge node 209.1 proximate to primary node 201 and writing second data block 216.2 to first row edge node 209.1; making additional diagonal nodes 211 with null data blocks 204 and additional edge nodes (209, 215) and interior nodes 210 with data blocks 216 by iteratively: firstly making another edge column node 215 and writing another data block 216 to said edge column node 215; secondly making another edge row node 209 and writing another data block 216 to said edge row node 209; thirdly and successively making interior nodes 211 along a counter-diagonal direction of data block matrix 200 and writing another data block 216 to each of interior nodes 211 upon creation of each of said interior node 211; and fourthly making another diagonal node 211 and writing another null data block 204 to said diagonal node 211; making hash row node r,_ 217 at location column.m at a terminus of each row and writing another data block 216 to each of said hash row node r,_ 217; and making a hash column node_,c 217 at location row.n at a terminus of each column and writing another data block 216 to said hash column node_,c 217, wherein: each hash row node 218 includes a hash of the nodes in the row containing said hash row node 218; each hash column node 217 includes a hash of the nodes in the column containing said hash column node 217; data block matrix 200 provides deletion of an arbitrary data block 216 while preserving hash-based integrity assurance that other data blocks 216 are unchanged; and data block matrix 200 provides modification, with hash values, of an arbitrary data block.

In an embodiment, in the medium, the operations further include: receiving a delete command to delete the arbitrary data block 216; and deleting the arbitrary data block 216 while preserving hash-based integrity assurance that other data blocks 216 are unchanged. According to an embodiment, in the medium, the operations further include: receiving a modification command to modify the arbitrary data block 216; and modifying the arbitrary data block 216 while preserving hash-based integrity assurance that other data blocks 216 are unchanged.

In an embodiment, in the medium, the operations further include: receiving a read command to read data block 216; determining a node in which data block 216 is written; computing a pointer row index and a pointer column index for the node in which data block 216 is written; and following the pointer row index and the pointer column index for the node in which data block 216 is written to a target node linked by the pointer row index and the pointer column index; and retrieving data block 216 written in the target node.

Data block matrix 200 has numerous advantageous and unexpected benefits and uses. In an embodiment, a process for providing arbitrary modification or deletion of a data block in includes: performing, with one or more processors, initialization for making data block matrix 200 and writing data blocks 216 in nodes of data block matrix 200, wherein: data block matrix 200 holds nodes that are arranged in rows and columns of data block matrix 200; a size of data block matrix 200 is n×m with the number of rows is n, and the number of columns is m; each node has location indexes location row.r and location column.c and pointer indexes pointer row.i and pointer column.j, wherein r, c, i, and j independently are integers; the location indexes provide a row indicated by integer r and column indicated by integer c at which the node is located in data block matrix 200, and the pointer indexes provide references, from a selected node to a first node and a second node, with pointer row.i being a pointer from the selected node to the first node that is in the same location row.r=i as the selected node and with pointer column.j being a pointer from the selected node to the second node that is in the same location column.c=j as the node; (location row.0, location column.0) of data block matrix 200 holds primary node 201; each (location row.0, location column . . . m−1) of data block matrix 200 holds column edge node 215; each (location row.1 . . . n−1, location column.0) of data block matrix 200 holds row edge node 209; data block matrix 200 holds diagonal nodes 211 at each (location row.r=c, location column.c) except for (location row.r=n, location column.m, for n=m) and; each row r of data block matrix 200 terminates at (location row.r, location column.m) that holds hash row node r,_ 218; and each column c of data block matrix 200 terminates at (location row.n, location column.c) that holds hash column node_c 217, the initialization including: receiving, with one or more processors, an initialization command to prepare the one or more processors for writing primary node 201 at (location row.0, location column.0) as first diagonal node 211.1; producing, with one or more processors in response to receiving the initialization command, primary node 201 at (location row.0, location column.0) and having pointers 206 comprising (pointer row.0, pointer column.0), wherein primary node 201 does not include null data block 204; and storing primary node 201 in memory; writing, with one or more processors, first null data block 204.1 including: receiving a write command to write first null data block 204.1; writing first null data block 204.1 to primary node 201; making edges nodes (209, 215) by: making first column edge node 215.1 proximate to primary node 201 and writing first data block 216.1 to first column edge node 215.1; and making a first row edge node 209.1 proximate to primary node 201 and writing second data block 216.2 to first row edge node 209.1; making additional diagonal nodes 211 with null data blocks 204 and additional edge nodes (209, 215) and interior nodes 210 with data blocks 216 by iteratively: firstly making another edge column node 215 and writing another data block 216 to said edge column node 215; secondly making another edge row node 209 and writing another data block 216 to said edge row node 209; thirdly and successively making interior nodes 211 along a counter-diagonal direction of data block matrix 200 and writing another data block 216 to each of interior nodes 211 upon creation of each of said interior node 211; and fourthly making another diagonal node 211 and writing another null data block 204 to said diagonal node 211; making hash row node r,_ 217 at location column.m at a terminus of each row and writing another data block 216 to each of said hash row node r,_ 217; and making a hash column node_,c 217 at location row.n at a terminus of each column and writing another data block 216 to said hash column node_,c 217, wherein: each hash row node 218 includes a hash of the nodes in the row containing said hash row node 218; each hash column node 217 includes a hash of the nodes in the column containing said hash column node 217; data block matrix 200 provides deletion of an arbitrary data block 216 while preserving hash-based integrity assurance that other data blocks 216 are unchanged; and data block matrix 200 provides modification, with hash values, of an arbitrary data block.

Figure 13:
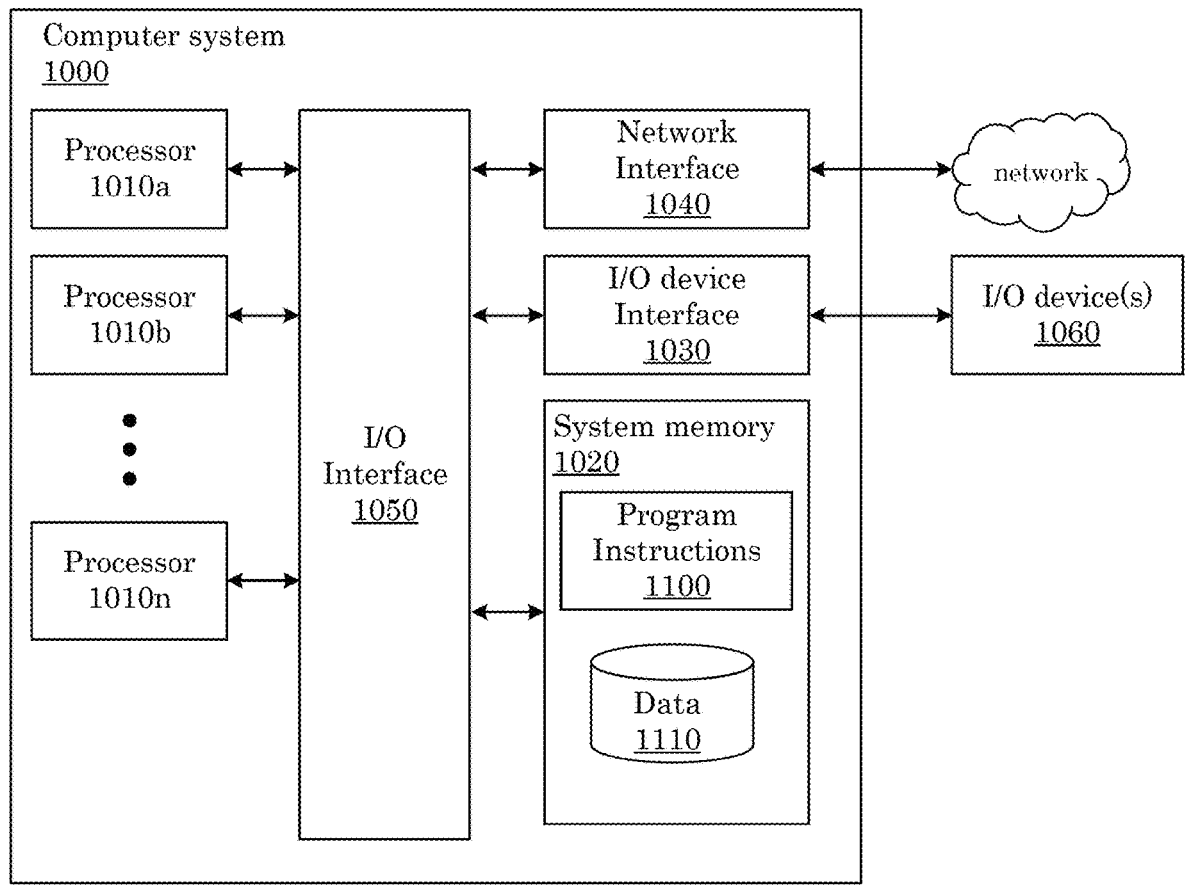
FIG. 13 shows is a physical architecture block diagram of a computing device to implement operations herein.

With reference to FIG. 13, it is contemplated that computing system 1000 operates in accordance with embodiments of the present operations, medium, and methods. Various portions of systems and methods described herein, can include or be executed on one or more computer systems similar to computing system 1000. Further, processes and modules described herein can be executed by one or more processing systems similar to that of computing system 1000.

Computing system 1000 can include one or more processors (e.g., processors 1010 a-1010 n) coupled to system memory 1020, an input/output I/O device interface 1030, and a network interface 1040 via an input/output (I/O) interface 1050. A processor can include a single processor or a plurality of processors (e.g., distributed processors). A processor can be any suitable processor capable of executing or otherwise performing instructions. A processor can include a central processing unit (CPU) that carries out program instructions to perform the arithmetical, logical, and input/output operations of computing system 1000. A processor can execute code (e.g., processor firmware, a protocol stack, a database management system, an operating system, or a combination thereof) that creates an execution environment for program instructions. A processor can include a programmable processor. A processor can include general or special purpose microprocessors. A processor can receive instructions and data from a memory (e.g., system memory 1020). Computing system 1000 can be a uni-processor system including one processor (e.g., processor 1010 a), or a multi-processor system including any number of suitable processors (e.g., 1010 a-1010 n). Multiple processors can be employed to provide for parallel or sequential execution of one or more portions of the techniques described herein. Processes, such as logic flows, described herein can be performed by one or more programmable processors executing one or more computer programs to perform functions by operating on input data and generating corresponding output. Processes described herein can be performed by, and apparatus can also be implemented as, special purpose logic circuitry, e.g., an FPGA (field programmable gate array) or an ASIC (application specific integrated circuit). Computing system 1000 can include a plurality of computing devices (e.g., distributed computer systems) to implement various processing functions.

I/O device interface 1030 can provide an interface for connection of one or more I/O devices 1060 to computer system 1000. I/O devices can include devices that receive input (e.g., from a user) or output information (e.g., to a user). I/O devices 1060 can include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 can be connected to computer system 1000 through a wired or wireless connection. I/O devices 1060 can be connected to computer system 1000 from a remote location. I/O devices 1060 located on remote computer system, for example, can be connected to computer system 1000 via a network and network interface 1040.

Network interface 1040 can include a network adapter that provides for connection of computer system 1000 to a network. Network interface can 1040 can facilitate data exchange between computer system 1000 and other devices connected to the network. Network interface 1040 can support wired or wireless communication. The network can include an electronic communication network, such as the Internet, a local area network (LAN), a wide area network (WAN), a cellular communications network, or the like.

System memory 1020 can be configured to store program instructions 1100 or data 1110. Program instructions 1100 can be executable by a processor (e.g., one or more of processors 1010 $a$-1010 $n$) to implement one or more embodiments of the present techniques. Instructions 1100 can include modules of computer program instructions for implementing one or more techniques described herein with regard to various processing modules. Program instructions can include a computer program (which in certain forms is known as a program, software, software application, script, or code). A computer program can be written in a programming language, including compiled or interpreted languages, or declarative or procedural languages. A computer program can include a unit suitable for use in a computing environment, including as a stand-alone program, a module, a component, or a subroutine. A computer program may or may not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one or more computer processors located locally at one site or distributed across multiple remote sites and interconnected by a communication network.

System memory 1020 can include a tangible program carrier having program instructions stored thereon. A tangible program carrier can include a non-transitory computer readable storage medium. A non-transitory computer readable storage medium can include a machine-readable storage device, a machine-readable storage substrate, a memory device, or any combination thereof. Non-transitory computer readable storage medium can include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 can include a non-transitory computer readable storage medium that can have program instructions stored thereon that are executable by a computer processor (e.g., one or more of processors 1010 $a$-1010 $n$) to cause the subject matter and the functional operations described herein. A memory (e.g., system memory 1020) can include a single memory device and/or a plurality of memory devices (e.g., distributed memory devices). Instructions or other program code to provide the functionality described herein can be stored on a tangible, non-transitory computer readable media. In an embodiment, the entire set of instructions can be stored concurrently on the media, or in some cases, different parts of the instructions can be stored on the same media at different times.

I/O interface 1050 can be configured to coordinate I/O traffic between processors 1010 $a$-1010 $n$, system memory 1020, network interface 1040, I/O devices 1060, and/or other peripheral devices. I/O interface 1050 can perform protocol, timing, or other data transformations to convert data signals from one component (e.g., system memory 1020) into a format suitable for use by another component (e.g., processors 1010 $a$-1010 $n$). I/O interface 1050 can include support for devices attached through various types of peripheral buses, such as a variant of the Peripheral Component Interconnect (PCI) bus standard or the Universal Serial Bus (USB) standard.

Embodiments of the operations described herein can be implemented using a single instance of computer system 1000 or multiple computer systems 1000 configured to host different portions or instances of embodiments. Multiple computer systems 1000 can provide for parallel or sequential processing or execution of one or more portions of the operations described herein.

Those skilled in the art will appreciate that computer system 1000 is merely illustrative and is not intended to limit the scope of the techniques described herein. Computer system 1000 can include any combination of devices or software that can perform or otherwise provide for the performance of the techniques described herein. For example, computer system 1000 can include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 can also be connected to other devices that are not illustrated or can operate as a stand-alone system. In addition, the functionality provided by the illustrated components can in some embodiments be combined in fewer components or distributed in additional components. Similarly, in some embodiments, the functionality of some of the illustrated components may not be provided or other additional functionality can be available.

Data block matrix 200 and processes disclosed herein have numerous beneficial uses, including financial services, patient care and clinical trials, electronic commerce, and as a component or building block for distributed data management applications of many types. Advantageously, data block matrix 200 overcomes limitations of technical deficiencies of conventional technologies such as meeting privacy requirements such as the European Union General Data Protection Regulation (GDPR), which provides that organizations delete information related to a particular individual at that person's request. This requirement is incompatible with current blockchain data structures, including private (permissioned) blockchains because blockchains are designed to ensure that block contents are immutable. Any change in a blockchain will invalidate subsequent hashes in following blocks, losing integrity protection. The block matrix structure retains cryptographic hash-based integrity protection for non-deleted blocks. Further, certain conventional methods for meeting privacy-sensitive data deletion requirements in a blockchain environment introduce serious risks because such conventional methods rely on storing encrypted data in the blockchain and erasing a separately stored key to prevent access to the data. This introduces risks for privacy-sensitive data because private data relating to individuals must be secured for decades, but progress in cryptography can result in the ability to decipher data stored a few decades earlier using new methods. Private data stored on a blockchain permanently may be readable in 30 years' time, even if the key is deleted, violating privacy requirements. The block data matrix allows data to be permanently deleted rather than secured for some period of time until encoded data becomes readable as cryptographic methods improve. The block data matrix data structure can be extended into more than two dimensions to an arbitrary number of dimensions to increase storage capacity without sacrificing integrity protection.

Data block matrix 200 and processes herein unexpectedly allows for deletion or modification of data blocks without losing hash protection for data integrity Moreover, data block matrix 200 also provides use of standardized and internationally accepted hash algorithms to protect data.

The articles and processes herein are illustrated further by the following Examples, which is non-limiting.

EXAMPLES

Example 1. Data Block Matrix for Integrity Protection and Provision of Modification A data block matrix is a data structure that supports the ongoing addition of hash-linked records while also allowing the deletion of arbitrary records, preserving hash-based integrity assurance that other blocks are unchanged. The data block matrix can be part of applications for integrity protection that conventionally use permissioned blockchains. This capability can meet privacy requirements such as the European Union General Data Protection Regulation (GDPR), wherein an organization can delete information related to a particular individual. Here, the data block matrix supports on-going addition of hash-linked records, deletion of arbitrary records, and preservation of hash-based integrity assurance that other blocks are unchanged.

A data block matrix is shown in FIG. 14 with rows and columns numbered for indexing nodes that in which are written data blocks, wherein a data block can include unspecified data (e.g., a single record or multiple transactions). Each row and column is terminated with a hash node that has a hash of data blocks written in the nodes in that row or column, e.g., $H_{0,\_}$ is a hash node of row 0. Alternatively, the hash value can be stored in the last block of the row or column. A second alternative could be to concatenate hashes of each block in a row or column and use the hash of this concatenation as the hash value for that row or column.

To delete the block labeled "X", write all zeroes to that data block or change the data block in another manner such as replacing or adding data to the data block. This change disrupts the hash values of $H_3$. and $H_{-,2}$ for row 3 and column 2. However, the integrity of all data blocks except the one containing "X" is still ensured by the other hash values. That is, other data blocks of row 3 are included in the hashes for columns 0, 1, 3, and 4. Similarly, other data blocks of column 2 are included in the hashes for rows 0, 1, 2, and 4. Thus the integrity of data blocks that have not been deleted is assured.

Blocks are numbered 1 . . . k and are added to the block data matrix starting with the node at cell 0,1. It is contemplated to keep diagonal nodes null while new blocks are written as follows:

```
{                // i, j = row, column indices
    if (i == j) {add null block; i = 0; j++;}
        else if (i < j) {add block(i,j); swap(i,j);}
```

```
        else if (i > j) {add block(i,j); j++; swap(i,j);{
},
``` wherein swap(i,j) exchanges the values of i and j, i.e., i'=j and j'=i. With this operation, nodes are filled with data blocks as shown in FIG. 3.

The data block matrix maintain selected properties such as data balance in the nodes of the supra-diagonal nodes and sub-diagonal nodes. Regarding data balance, nodes are filled in a balanced manner, wherein the upper half(above diagonal), supra-diagonal nodes contain at most one additional cell more than the lower half (below diagonal), sub-diagonal nodes. The following invariant is maintained for each iteration of the loop:

$$(i=j \lor i<j) \land u=l \lor i>j \land u=l+1$$

wherein u=number of nodes above the diagonal nodes of the data block matrix, and l=number of nodes below the diagonal nodes of the data block matrix. Further, with regard to the hash chain length, the number of blocks in a row or column hash chain is proportional to $\sqrt{N}$ for a matrix with N blocks, by the balance property. As used herein, row hash chain refers to a hash value for the respective row. As used herein, column hash chain refers to a hash value for the respective column. Moreover, the data block matrix provides data block dispersal, wherein no consecutive data blocks are written in nodes in the same row or column. That is, for any two data blocks numbered a, b, where b=a+1, in rows ia and ib, and columns ja and jb respectively, ia≠ib and ja≠jb. This can be shown by considering cases below.

1. If i<j, then block a will be written to node (ia,ja) and then i and j swapped so that in the next iteration, i>j, and data block b is written to node (ib,jb). Since ib=ja and jb=ia, and i≠j, ia≠ib and ja≠jb.
2. If i>j, then data block a is be written to node (ia,ja), j is incremented, and then i and j swapped. Then either the relationship is unchanged, with i>j, or i=j.
    If i=j, then no data block will be written in the next iteration, but i will be set to 0 and j will be incremented such that i<j, and the next data block written with ib=0 and jb=ja+1, ensuring that ia≠ib and ja≠jb.
    If i>j, then on the next iteration, block b will be written with ib=ja and jb=ia, and i≠j, so that ia≠ib and ja≠jb.

Because no two consecutive data blocks appear in the same row or column, a user can delete two consecutive data blocks simultaneously without disturbing integrity protection for other data blocks because diagonal nodes include null data blocks. Without this property, for example, the following In FIG. 15, if data blocks 7 and 8 are deleted, then integrity protection for data blocks 4 and 9 is lost because hashes would be invalidated for row 1, column 2, and row 2, column 1. Then nodes (1,1) and (2,2) have neither row nor column hashes.

With regard to a number of data blocks, the total number of data blocks in the data block matrix is $N^2-N$ since diagonal nodes contain null data blocks. Thus, the last numbered data block in a filled matrix of N rows and columns is number $N^2-N$. With rows and columns numbered from 0, i=N−1, and the last data block in the lower half (below diagonal) is $(i+1)^2-(i+1)=i^2+i$, and for any row i, the last data block in the lower half is numbered $i^2+i$. Accordingly, the last data block in row i−1 in the lower half is $i^2-i$ and the first in row i is $i^2-i+2$. Similarly, the last upper half data block in column j is $j^2+j-1$.

With regard to a location of a data block, with the relations above, expressions to locate a given data block within the data block matrix is provided. For a data block B in the lower half (B is even) of the data block matrix:

$$s=\lfloor\sqrt{B}\rfloor$$

$$i=B\leq s^2+s?s:s+1$$

$$j=(B-(i^2-i+2))/2$$

and for data block B in the upper half (B is odd):

$$s=\lfloor\sqrt{B+1}\rfloor$$

$$j=B<s^2+s?s:s+1$$

$$i=(B-(j^2-j+1))/2$$

Data blocks can be deleted by overwriting with zeroes, with one row and one column hash recalculated. After deleting data block i, j, row i and column j, hash values are recalculated.

The data block matrix can be used for incorporation into applications requiring integrity protection that conventionally use permissioned blockchains. This capability could be used in meeting privacy policies for organizations to delete information related to a particular individual. Such modification of data in data blocks can be incompatible with conventional blockchain data structures, including private, i.e., permissioned, blockchains because blockchains ensure that block contents are immutable. A change in a blockchain can invalidate subsequent hashes in following blocks, losing integrity protection. The data block matrix retains integrity protection of non-deleted blocks and also can be extended beyond two dimensions to an arbitrary number of dimensions, with straightforward extensions to the algorithms above.

Example 2. Managing Data for a Clinical Trial with a Data Block Matrix

Figure 16:
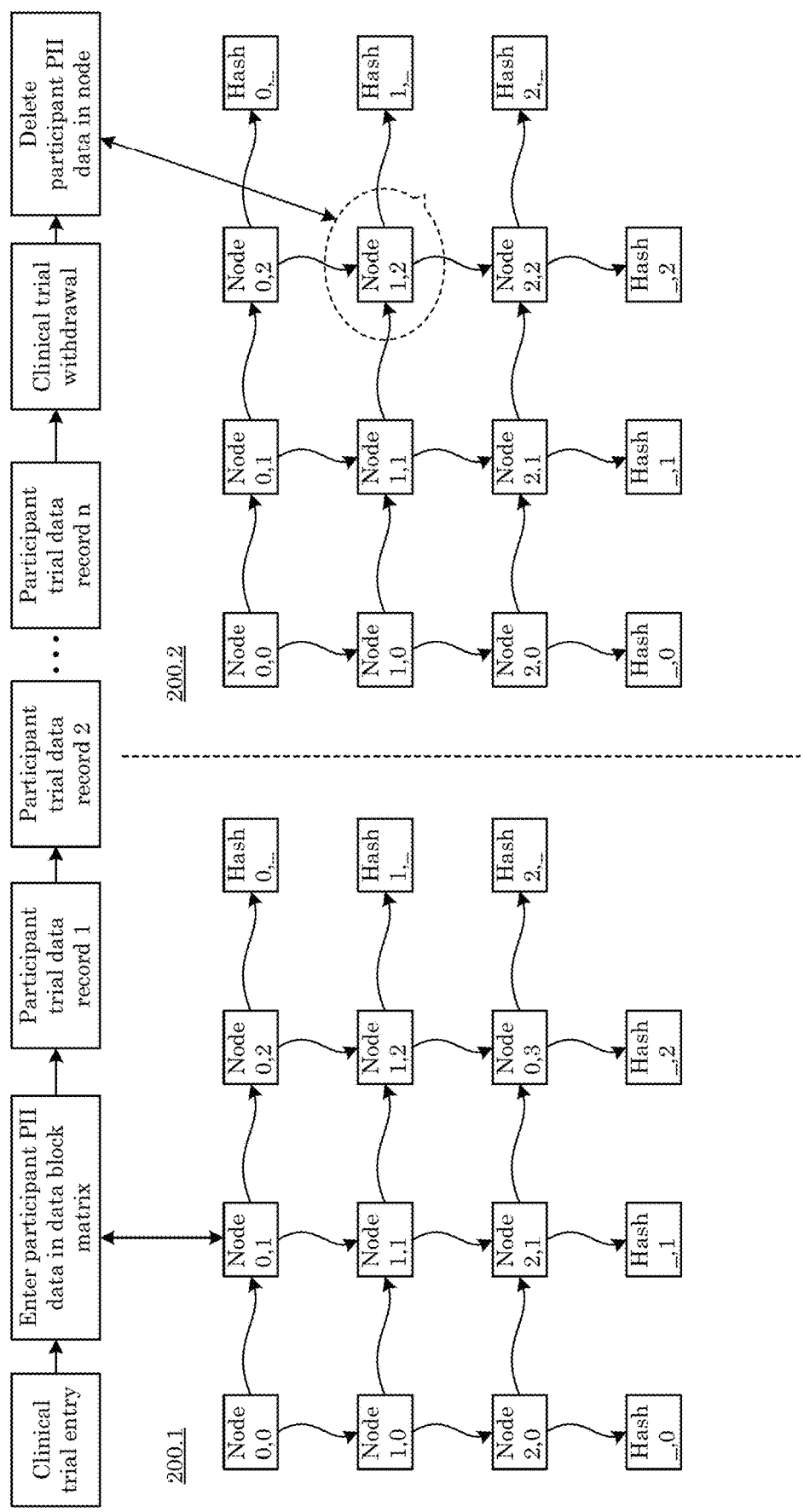
FIG. 16 shows managing data for a clinical trial with a data block matrix.

With reference to FIG. 16, a process for managing data for a clinical trial with a data block matrix includes entry of multiple participants in a trial, recording of their Personally Identifiable Information (PI) data in the data block matrix, completion of the trial and withdrawal of the participants, and deletion of their PII data from the data block matrix. Initially, as shown in 200.1, data for participant 1 is recorded in the first data block above the diagonal, according to the writing process described in Example 1. This block, in location 0,1 is identified on the drawing. PI data for participants 2 through n will then be recorded in data blocks that are located using the process described in Example 1. When the trial process is completed, it is necessary to delete PI from the data block matrix, as shown in 200.2. FIG. 16, 200.2, shows an example deletion for participant number 5. The ij locations are computed according to the process shown in FIG. 11, locating the node, for which data is to be deleted, at location 1,2. Data will be deleted by overwriting with zeroes. PI data for other participants is then processed in the same manner.

While one or more embodiments have been shown and described, modifications and substitutions can be made thereto without departing from the spirit and scope of the invention. Accordingly, it is to be understood that the present invention has been described by way of illustrations and not limitation. Embodiments herein can be used independently or can be combined.

Those skilled in the art will also appreciate that while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from computer system 1000 can be transmitted to computer system 1000 via transmission media or signals such as electrical, electromagnetic, or digital signals, conveyed via a communication medium such as a network or a wireless link. Various embodiments can further include receiving, sending, or storing instructions or data implemented in accordance with the foregoing description upon a computer-accessible medium. Accordingly, the present techniques can be practiced with other computer system configurations.

In block diagrams, illustrated components are depicted as discrete functional blocks, but embodiments are not limited to systems in which the functionality described herein is organized as illustrated. The functionality provided by each of the components can be provided by software or hardware modules that are differently organized than is presently depicted, for example such software or hardware can be intermingled, conjoined, replicated, broken up, distributed (e.g. within a data center or geographically), or otherwise differently organized. The functionality described herein can be provided by one or more processors of one or more computers executing code stored on a tangible, non-transitory, machine readable medium. In some cases, notwithstanding use of the singular term "medium," the instructions can be distributed on different storage devices associated with different computing devices, for instance, with each computing device having a different subset of the instructions, an implementation consistent with usage of the singular term "medium" herein. In some cases, third party content delivery networks can host some or all of the information conveyed over networks, in which case, to the extent information (e.g., content) is said to be supplied or otherwise provided, the information can provided by sending instructions to retrieve that information from a content delivery network.

Example 3. Component for Distributed Database Applications

With their features of providing distributed, trusted data using no central server, conventional blockchains have some desirable properties for many complex distributed systems, and a number of implementations have been proposed. However, some environments and applications are not well suited to using blockchains. For example, cryptocurrency, for which blockchains were designed, include pseudo-anonymity, which many distributed database applications for finance or e-commerce require legitimate identification for government and tax purposes. Blockchains were also designed for small transaction sizes, which while acceptable for cryptocurrencies is not suitable for large documents or images, or other large data that may be required in distributed systems. Additionally, the primary property of blockchain and conventional distributed ledger systems is the immutability property, which prevents changes to any data without requiring a complete recomputation of all block hashes.

It is contemplated that the data block matrix is a component or building block in constructing distributed database systems because it provides integrity guarantees of blockchain but has low resource consumption and provides revising data blocks. As a component for database applications, the block data matrix provides numerous functions such as:

for a data block matrix
public BlockMatrix(int dimension): constructor; creates a BlockMatrix of the specified dimension; BlockMatrix can hold (dimension*dimension)−dimension blocks;
public void setUpSecurity( ): sets up security provider in order to use the Java Security API;
public void generate(Wallet, float value): create genesis block, making a transaction that transfers value to wallet;
public void addBlock(Block newBlock): adds newBlock to a BlockMatrix;
public Block getBlock(int blockNumber): returns the block in the BlockMatrix specified by blockNumber, which is the number of the block in terms of when it was inserted (e.g. 1st block, 2nd block, etc.); block numbers begin with 1. They are not 0-indexed;
public ArrayList<Transaction>getBlockTransactions(int blockNumber): returns a list of all transactions in the block specified by blockNumber;
public void clearInfoInTransaction(int blockNumber, int transactionNumber): clears the info in the transaction specified by transactionNumber in the block specified by blockNumber; e.g., to clear the 1st transaction in the second block, type clearInfoInTransaction(2, 1);
public int getInputCount( ): returns the number of blocks that have been added to the BlockMatrix;
public String[ ] getRowHashes( ): returns an array of all the row hashes of the BlockMatrix;
public String[ ] getColumnHashes( ): returns an array of all the column hashes of the BlockMatrix;
public float getMinimumTransaction( ): returns the value of the minimum transaction of the BlockMatrix;
public void setMinimumTransaction(float num): changes the value of the minimum transaction of the BlockMatrix to num;
public int getDimension( ): returns the dimension of the BlockMatrix:
public ArrayList<Integer>getBlocksWithModifiedData( ): returns a list of the blocks (by number) that have had their data cleared after being added to the BlockMatrix;
public void printRowHashes( ): prints the row hashes of the BlockMatrix;
public void printColumnHashes( ): prints the row hashes of the BlockMatrix;
public void printHashes: prints all hashes of the BlockMatrix;
public Boolean isMatrixValid( ): returns true or false depending on whether the
BlockMatrix has been tampered with and if it is or is not still secure;
for a block
public Block( ): constructor; creates a block;
public boolean addTransaction(Transaction transaction): adds a transaction to the block; returns true if the transaction is added successfully, and false if not;
public ArrayList<Transaction>getTransactions( ): returns a list of all transactions in the Block;
public String getHash( ): returns the hash of the block;
public void printBlockTransactions( ): prints transaction details of each transaction in the block;
for a transaction
public int getBlockNumber( ): returns the number of the block in which the transaction is stored;
public String getTransactionId( ): returns the id of the transaction; the id is the hash of the transaction;
public PublicKey getSender( ): returns the PublicKey of the sender of the transaction;
public PublicKey getRecipient( ): returns the PublicKey of the recipient of the transaction;
public float getValue( ): returns the value of the transaction, e.g., an amount being sent;
public String getInfo( ): returns the info or message being passed along with the transaction;
public byte[ ] getSignature( ): returns the signature of the transaction;
public ArrayList<TransactionInput>getInputs( ): returns a list of all inputs of the transaction;
public ArrayList<TransactionOutput>getOutputs( ): returns a list of all outputs of the transaction;
TransactionInput
public String getTransactionOutputId( ): returns the id of the TransactionOutput a TransactionInput is referencing;
public TransactionOutput getUTXO( ): returns unspent TransactionOutput the TransactionInput is using;
TransactionOutput
public String getTransactionOutputId( ): returns the id of the TransactionOutput the TransactionInput is referencing;
public TransactionOutput getUTXO( ): returns unspent TransactionOutput the TransactionInput is using;
public String getId( ): returns the id of the TransactionOutput; the id is a hash of the TransactionOutput;
public PublicKey getRecipient( ): returns the PublicKey of the recipient, the new owner of the coins from this TransactionOutput;
public float getValue( ): returns the amount of the asset in this TransactionOutput;
public String getParentTransactionId( ): returns the id of the Transaction this output was created in; and
Wallet
public Wallet( ): constructor; create a wallet;
public float getBalance( ): returns the balance of this wallet;
public Transaction sendFunds(PublicKey recipient, float value, String info): returns a transaction that sends value funds from this wallet to the wallet specified by recipient, along with the message info;
public PublicKey getPublicKey( ): returns the PublicKey of this wallet;
public HashMap<String, TransactionOutput>getUTXOs( ): returns a HashMap of the unspent TransactionOutputs owned by this wallet; keys are the TransactionOutput ids, whereas the values are the TransactionOutputs.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Optional or optionally means that the subsequently described event or circumstance can or cannot occur, and that the description includes instances where the event occurs and instances where it does not. As used herein, combination is inclusive of blends, mixtures, alloys, reaction products, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms a and an and the and similar referents in the context of describing the invention (especially in the context of the following claims) are to be construed to cover both the singular and the plural, unless otherwise indicated herein or clearly contradicted by context. Or means and/or. It can further be noted that the terms first, second, primary, secondary, and the like herein do not denote any order, quantity, or importance, but rather are used to distinguish one element from another. The modifier about used in connection with a quantity is inclusive of the stated value and has the meaning dictated by the context (e.g., it includes the degree of error associated with measurement of the quantity). The conjunction or is used to link objects of a list or alternatives and is not disjunctive; rather the elements can be used separately or can be combined under appropriate circumstances.

What is claimed is:

1. A tangible, non-transitory, machine-readable medium storing instructions that when executed by one or more processors effectuate operations comprising:
   performing, with one or more processors, initialization for making a data block matrix and writing data blocks in nodes of the data block matrix, wherein:
      the data block matrix holds nodes that are arranged in rows and columns of the data block matrix; a size of the data block matrix is n×m with the number of rows is n, and the number of columns is m, wherein m and n are positive integers;
      each node has location indexes location row.r and location column.c and pointer indexes pointer row.i and pointer column.j, wherein r, c, i, and j independently are positive integers; the location indexes provide a row indicated by integer r and column indicated by integer c at which the node is located in the data block matrix, and the pointer indexes provide references, from a selected node to a first node and a second node, with pointer row.i being a pointer from the selected node to the first node that is in the same location row.r=i as the selected node and with pointer column.j being a pointer from the selected node to the second node that is in the same location column.c=j as the node;
      (location row.0, location column.0) of the data block matrix holds a primary node; each (location row.0, location column.1 ... m−1) of the data block matrix holds a column edge node; each (location row.1 ... n−1, location column.0) of the data block matrix holds a row edge node; the data block matrix holds diagonal nodes at each (location row.r=c, location column.c) except for (location row.r=n, location column.m, for n=m) and; each row r of the data block matrix terminates at (location row.r, location column.m) that holds a hash row node r,_; and each column c of the data block matrix terminates at (location row.n, location column.c) that holds a hash column node_,c, the initialization comprising:
         receiving, with one or more processors, an initialization command to prepare the one or more processors for writing the primary node at (location row.0, location column.0) as a first diagonal node;
         producing, with one or more processors in response to receiving the initialization command, the primary node at (location row.0, location column.0) and having pointers comprising (pointer row.0, pointer column.0), wherein the primary node does not include a null data block; and
         storing the primary node in memory;
      writing, with one or more processors, a first null data block comprising:
         receiving a write command to write a first null data block;
         writing the first null data block to the primary node;
         making edges nodes by:
            making a first column edge node proximate to the primary node and writing a first data block to the first column edge node; and
            making a first row edge node proximate to the primary node and writing a second data block to the first row edge node;
      making additional diagonal nodes with null data blocks and additional edge nodes and interior nodes with data blocks by iteratively:
         firstly making another edge column node and writing another data block to said edge column node;
         secondly making another edge row node and writing another data block to said edge row node;
         thirdly and successively making interior nodes along a counter-diagonal direction of the data block matrix and writing another data block to each of the interior nodes upon creation of each of said interior nodes; and
         fourthly making another diagonal node and writing another null data block to said diagonal node;
      making a hash row node r, at location column.m at a terminus of each row and writing another data block to each said hash row node r,_; and
      making a hash column node_,c at location row.n at a terminus of each column and writing another data block to said hash column node_,c,
      wherein:
         each hash row node comprises a hash of nodes in the row containing said hash row node;
         each hash column node comprises a hash of nodes in the column containing said hash column node;
         the data block matrix provides deletion of an arbitrary data block while preserving hash-based integrity assurance that other data blocks are unchanged; and
         the data block matrix provides modification, with hash values, of an arbitrary data block.

2. The medium of claim 1, wherein the operations further comprise:
   receiving a delete command to delete the arbitrary data block; and
   deleting the arbitrary data block while preserving hash-based integrity assurance that other data blocks are unchanged.

3. The medium of claim 1, wherein the operations further comprise:
   receiving a modification command to modify the arbitrary data block; and modifying the arbitrary data block while preserving hash-based integrity assurance that other data blocks are unchanged.

4. The medium of claim 1, wherein the operations further comprise:
receiving a read command to read a data block;
determining a node in which the data block is written;
computing a pointer row index and a pointer column index for the node in which the data block is written; and
following the pointer row index and the pointer column index for the node in which the data block is written to a target node linked to by the pointer row index and the pointer column index; and
retrieving a data block written in the target node.

5. A method comprising:
performing, with one or more processors, initialization for making a data block matrix and writing data blocks in nodes of the data block matrix, wherein:
the data block matrix holds nodes that are arranged in rows and columns of the data block matrix; a size of the data block matrix is n×m with the number of rows is n, and the number of columns is m, wherein m and n are positive integers;
each node has location indexes location row.r and location column.c and pointer indexes pointer row.i and pointer column.j, wherein r, c, i, and j independently are positive integers; the location indexes provide a row indicated by integer r and column indicated by integer c at which the node is located in the data block matrix, and the pointer indexes provide references, from a selected node to a first node and a second node, with pointer row.i being a pointer from the selected node to the first node that is in the same location row.r=i as the selected node and with pointer column.j being a pointer from the selected node to the second node that is in the same location column.c=j as the node;
(location row.0, location column.0) of the data block matrix holds a primary node; each (location row.0, location column.1 ... m−1) of the data block matrix holds a column edge node; each (location row.1 ... n−1, location column.0) of the data block matrix holds a row edge node; the data block matrix holds diagonal nodes at each (location row.r=c, location column.c) except for (location row.r=n, location column.m, for n=m) and; each row r of the data block matrix terminates at (location row.r, location column.m) that holds a hash row node r,_; and each column c of the data block matrix terminates at (location row.n, location column.c) that holds a hash column node_,c, the initialization comprising:
receiving, with one or more processors, an initialization command to prepare the one or more processors for writing the primary node at (location row.0, location column.0) as a first diagonal node;
producing, with one or more processors in response to receiving the initialization command, the primary node at (location row.0, location column.0) and having pointers comprising (pointer row.0, pointer column.0), wherein the primary node does not include a null data block; and
storing the primary node in memory;
writing, with one or more processors, a first null data block comprising:
receiving a write command to write a first null data block;
writing the first null data block to the primary node;
making edges nodes by:
making a first column edge node proximate to the row edge node and writing a first data block to the first column edge node; and
making a first row edge node proximate to the row edge node and writing a second data block to the first row edge node;
making additional diagonal nodes with null data blocks and additional edge nodes and interior nodes with data blocks by iteratively:
firstly making another edge column node and writing another data block to said edge column node;
secondly making another edge row node and writing another data block to said edge row node;
thirdly and successively making interior nodes along a counter-diagonal direction of the data block matrix and writing another data block to each of the interior nodes upon creation of each of said interior nodes; and
fourthly making another diagonal node and writing another null data block to said diagonal node;
making a hash row node r,_ at location column.m at a terminus of each row and writing another data block to each said hash row node r,_; and
making a hash column node_,c at location row.n at a terminus of each column and writing another data block to said hash column node_,c,
wherein:
each hash row node comprises a hash of nodes in the row containing said hash row node;
each hash column node comprises a hash of nodes in the column containing said hash column node;
the data block matrix provides deletion of an arbitrary data block while preserving hash-based integrity assurance that other data blocks are unchanged; and
the data block matrix provides modification, with hash values, of an arbitrary data block.

6. The method of claim 5, further comprising:
receiving a delete command to delete the arbitrary data block; and
deleting the arbitrary data block while preserving hash-based integrity assurance that other data blocks are unchanged.

7. The method of claim 5, further comprising:
receiving a modification command to modify the arbitrary data block; and
modifying the arbitrary data block while preserving hash-based integrity assurance that other data blocks are unchanged.

8. The method of claim 5, further comprising:
receiving a read command to read a data block;
determining a node in which the data block is written;
computing a pointer row index and a pointer column index for the node in which the data block is written; and
following the pointer row index and the pointer column index for the node in which the data block is written to a target node linked to by the pointer row index and the pointer column index; and
retrieving a data block written in the target node.

* * * * *